(12) United States Patent
Wan et al.

(10) Patent No.: US 6,707,293 B2
(45) Date of Patent: Mar. 16, 2004

(54) 360-DEGREE ROTARY POSITION SENSOR HAVING A MAGNETORESISTIVE SENSOR AND A HALL SENSOR

(75) Inventors: Hong Wan, Plymouth, MN (US); Tamara Bratland, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 39 days.

(21) Appl. No.: 10/002,454

(22) Filed: Nov. 15, 2001

(65) Prior Publication Data

US 2003/0090265 A1 May 15, 2003

(51) Int. Cl.[7] .............................. G01B 7/30; G01R 33/06
(52) U.S. Cl. .............................. 324/207.25; 324/207.2; 324/207.21; 324/207.14
(58) Field of Search .............................. 324/225, 207.12, 324/207.2, 207.21, 235, 207.23, 207.25, 207.14; 338/32 H, 32 R

(56) References Cited

U.S. PATENT DOCUMENTS

| | | | |
|---|---|---|---|
| 4,283,679 A | | 8/1981 | Ito et al. .............................. 324/165 |
| 4,712,064 A | * | 12/1987 | Eckardt et al. ........ 324/207.12 |
| 4,728,950 A | | 3/1988 | Hendrickson |
| 5,497,082 A | * | 3/1996 | Hancock ................ 324/207.14 |
| 5,736,852 A | * | 4/1998 | Pattantyus .................. 324/166 |
| 5,880,586 A | * | 3/1999 | Dukart et al. ............ 324/207.2 |
| 6,064,197 A | | 5/2000 | Lockmann et al. .... 324/207.14 |
| 6,198,275 B1 | * | 3/2001 | Wolf et al. ............ 324/207.12 |
| 6,212,783 B1 | * | 4/2001 | Ott et al. .................... 33/1 PT |
| 6,326,781 B1 | * | 12/2001 | Kunde et al. .......... 324/207.21 |
| 6,355,998 B1 | * | 3/2002 | Schob et al. .............. 310/68 B |

OTHER PUBLICATIONS

Schodlbauer, Dieter, "An Absolute Encoding, Magnetoresistive Multi–Turn Angular Position Sensor" Presented at Sensor 2001, May 8–10, 2001, Exhibition Centre, Nuremberg, Germany.

* cited by examiner

Primary Examiner—N. Le
Assistant Examiner—Reena Aurora
(74) Attorney, Agent, or Firm—McDonnell Boehnen Hulbert & Berghoff

(57) ABSTRACT

By combining outputs from a Hall sensor and a magnetoresistive (MR) sensor, a 360-degree rotary position sensor can be achieved. The Hall sensor and the MR sensor both detect a magnetic field produced by a magnet. The Hall sensor detects the polarity of the magnetic field, while the MR sensor detects the angular position of the magnetic field, up to 180-degrees. With a positive output from the Hall sensor, the first 180-degrees of the angular position is detected. With a negative output from the Hall sensor, the second 180-degrees of the angular position is detected.

32 Claims, 4 Drawing Sheets

360-DEGREE ROTARY POSITION SENSOR HAVING A MAGNETORESISTIVE SENSOR AND A HALL SENSOR

FIELD

The present invention relates generally to position sensors, and more particularly, relates to a 360-degree rotary position sensor.

BACKGROUND

Magnetic sensing devices have many applications, including navigation, position sensing, current sensing, vehicle detection, and rotational displacement. There are many types of magnetic sensors, but essentially they all provide at least one output signal that represents the magnetic field sensed by the device. The Earth, magnets, and electrical currents can all generate magnetic fields. The sensor may be able to detect the presence, the strength, and/or the direction of the magnetic field. The strength of the magnetic field may be represented by a magnitude and a polarity (positive or negative). The direction of the magnetic field may be described by its angular position with respect to the sensor. One of the benefits of using magnetic sensors is that the output of the sensor is generated without the use of contacts. This is a benefit because over time contacts can degrade and cause system failures.

A Hall sensor is a type of magnetic sensor that uses the Hall effect to detect a magnetic field. The Hall effect occurs when a current-carrying conductor is placed into a magnetic field. A voltage is generated perpendicular to both the current and the field. The voltage is proportional to the strength of the magnetic field to which it is exposed. The current-carrying conductor is called a Hall element and it is typically composed of a semiconductor material. While Hall sensors are very reliable and have many useful applications, they are not as sensitive as magnetoresistive (MR) sensors. Hall sensors may also be more limited to the type of magnet used than an MR sensor.

MR sensors are a type of magnetic sensor that uses the magnetoresistive effect to detect a magnetic field. Ferromagnetic metals, such as the nickel-iron alloy commonly known as Permalloy, alter their resistivity in the presence of a magnetic field. When a current is passed through a thin ferromagnetic film in the presence of a magnetic field, the voltage will change. This change in voltage represents the strength or direction of the magnetic field. By designing an MR sensor in a Wheatstone bridge configuration, either the strength or direction of the magnetic field can be measured. MR sensors provide a high-sensitivity and high-accurate output.

Position sensors that are capable of sensing 360-degrees of rotation would be desirable for many rotary applications, such as for control of an automobile steering wheel. Typical position sensors that can sense 360-degrees of rotation contain potentiometers, which require contacts. As previously mentioned, contacts can degrade over time causing reliability issues.

Hall sensors or Giant Magneto-Resistive (GMR) sensors have also been used as 360-degree position sensors. While these sensors provide a contactless solution, they do not provide enough accuracy for many applications. In addition, these sensors cannot function in applications that require large tolerances for either the strength of the magnet or the distance between the magnet and the sensor.

Optical sensors have also been used as a contactless 360-degree rotary sensor; however, optical sensors are incremental sensors and must be calibrated every time they are powered, which limits their applicability.

Therefore, it would be desirable to have a 360-degree rotary position sensor that is highly accurate, can be used with simple magnet designs, and operates without contacts.

SUMMARY

A 360-degree rotary position sensor is comprised of a Hall sensor and a magnetoresistive (MR) sensor. Either a magnet or the 360-degree rotary position sensor is mounted on a rotating shaft. The 360-degree rotary position sensor is located substantially close to the magnet, so that the 360-degree rotary position sensor is capable of detecting a magnetic field produced by the magnet. The Hall sensor detects a polarity of the magnetic field. The MR sensor detects an angular position of the magnetic field up to 180-degrees. A combination of an output from the Hall sensor and an output from the MR sensor provides sensing of the angular position of the magnetic field up to 360-degrees.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
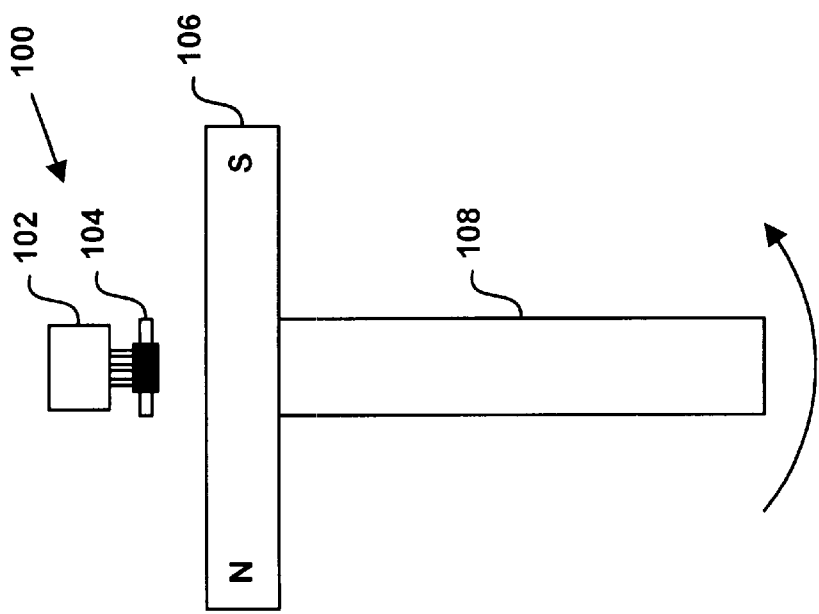
FIG. 1 is an illustration of an exemplary embodiment of a 360-degree rotary position sensor.

FIG. 1 shows an exemplary embodiment of a 360-degree rotary position sensor 100. FIG. 1 is not drawn to scale and is an approximation of the position sensor 100. The position sensor 100 includes a Hall sensor 102 and a magnetoresistive (MR) sensor 104. The position sensor 100 may be located substantially close to a magnet 106, such that the position sensor 100 may be capable of detecting a magnetic field produced by the magnet 106. The magnet 106 may be substantially located on an end of a rotating shaft 108. The rotating shaft 108 may be any object that rotates. For example, the rotating shaft 108 may be an automobile steering wheel column.

In an exemplary embodiment, the Hall sensor 102 may be a SS495 sensor from Honeywell; however, other Hall sensors that are capable of detecting a polarity of the magnetic field may be used. The Hall sensor 102 may include at least one Hall element, which may be composed of a semiconductor material. When the Hall sensor 102 detects the magnetic field produced by the magnet 106, the current distribution in the at least one Hall element is disturbed, which results in a voltage change that is proportional to the magnetic field. The magnetic field may be either positive or negative. This quality may be described as the polarity of the magnetic field. An output of the Hall sensor 102 may include the polarity of the magnetic field.

In an exemplary embodiment, the MR sensor 104 may be an HMC1512 sensor from Honeywell; however, other MR sensors that are capable of detecting an angular position of the magnetic field with an angle range of 180-degrees may also be used. The MR sensor 104 may include at least one Wheatstone bridge composed of four resistive legs. The resistive legs may be composed of long thin strips of a ferromagnetic film, such as Permalloy. The legs may be oriented to be sensitive to the magnetic field. When the MR sensor 104 is exposed to the magnetic field, the resistivity of the legs of the at least one Wheatstone bridge may change with respect to the strength and the angle of the magnetic field. An output of the MR sensor 104 may include the angular position of the magnetic field up to an angle range of 180-degrees.

The magnet 106 may be a bar magnet having a north and a south pole. Alternatively, the magnet 106 may be a disc magnet with a pair of poles. Other magnet configurations that provide two poles and a substantially uniform magnetic field near the position sensor 100 may also be employed. The magnet 106 may be composed of a ferromagnetic material. For example, the magnet 106 may be composed of neodymium iron boron (NdFeB), samarium cobalt (SmCo), Alnico, or ceramic ferrite. The choice of the magnet 106 may be based on cost, size, maximum magnetic energy, and maximum operating temperature.

In an exemplary embodiment, the magnet 106 may be mounted on the rotating shaft 108. The 360-degree rotary position sensor 100 may be located substantially close to the magnet 106 in a fixing plane. The fixing plane may be a stationary plane perpendicular to an axis of rotation. The axis of rotation may be defined as an imaginary line passing through the rotating shaft 108. In an alternative embodiment, the position sensor 100 may be mounted on the rotating shaft 108, while the magnet 106 may be located in the fixing plane substantially close to the position sensor 100.

The MR sensor 104 may be located substantially parallel to the magnet 106 and substantially at a center of the axis of rotation of the rotating shaft 108. There may be a gap substantially between the MR sensor 104 and the magnet 106. The size of the gap may depend on the strength of the magnet 106 and the 360-degree rotary position sensor 100 application. The minimum gap may be determined by mechanical clearance and tolerance, while the maximum gap may be determined by the magnetic field strength. For example, the gap may be within the range of 3–10 mm when using an Alnico magnet.

The strength of the magnetic field may decrease as the gap increases. The strength of the magnetic field at the position sensor 100 may have to exceed the minimum field requirement to provide saturation operations of the MR sensor 104 and to meet the Hall sensor operating field range. For example, the strength of the magnetic field at the position sensor 100 may be 50–100 gauss. However, the 360-degree rotary position sensor 100 may be operable with a magnetic field strength less than 50 gauss or greater than 100 gauss. The magnetic field may be measured substantially in the direction perpendicular to the axis of rotation of the rotating shaft 108.

The Hall sensor 102 may be located on a non-magnet side of the MR sensor 104, substantially at the center of the axis of rotation of the rotating shaft 108. The non-magnet side of the MR sensor 104 may be a side of the MR sensor that is substantially parallel to the magnet 106, but the furthest distance from the magnet 106. The Hall sensor 102 may be capable of detecting the magnetic field generated by the magnet 106.

Figure 2:
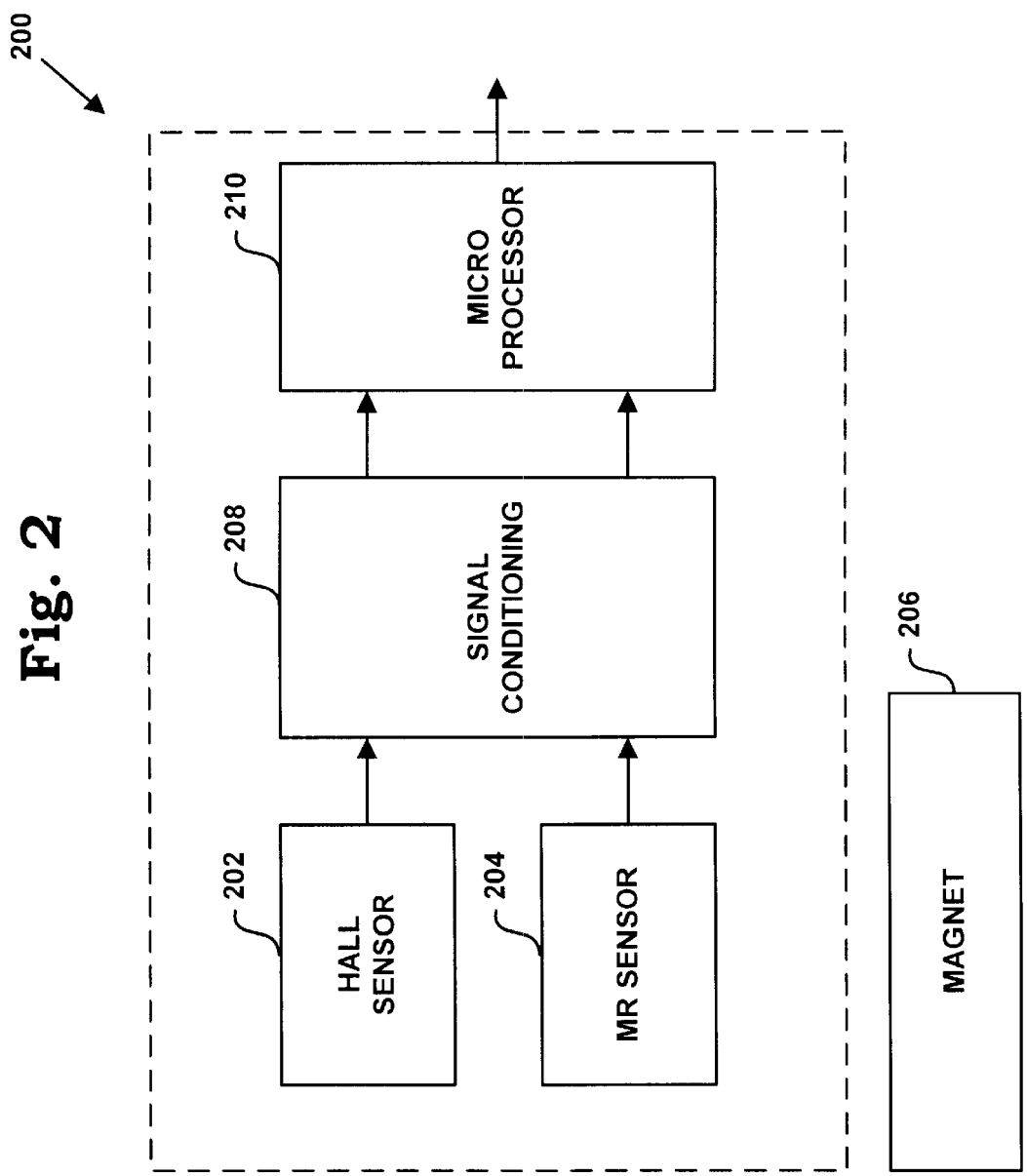
FIG. 2 is a simplified block diagram of a 360-degree rotary position sensor, according to an exemplary embodiment.

FIG. 2 shows a simplified block diagram of a 360-degree rotary position sensor 200 according to an exemplary embodiment. FIG. 2 does not portray actual locations of each component within the position sensor 200 and is intended to be illustrative only. The 360-degree rotary position sensor 200 includes a Hall sensor 202, an MR sensor 204, signal conditioning 208, and a microprocessor 210. The Hall sensor 202 may be substantially the same as the Hall sensor 102 of the 360-degree rotary position sensor 100. The MR sensor 204 may be substantially the same as the MR sensor 104 of the 360-degree rotary position sensor 100.

A magnet 206 may be located substantially close to the position sensor 200. The magnet 206 may be substantially the same as the magnet 106 shown in FIG. 1. Either the magnet 206 or the position sensor 200 may be mounted on a rotating shaft (not shown in FIG. 2).

The Hall sensor 202 may be used to measure the strength of a magnetic field. An output of the Hall sensor 202 may provide a positive or a negative polarity based on the measured strength of the magnetic field. The polarity may be dependant upon whether a north or a south pole of the magnet 206 is detected. For example, if the south pole of the magnet 206 is detected, the output of the Hall sensor 202 may be positive, and if the north pole of the magnet 206 is detected then the output of the Hall sensor 202 may be negative. The Hall sensor 204 may sense polarity without the use of contacts.

The MR sensor 204 may be used to measure the angular position of the magnetic field up to a maximum of 180-degrees. The MR sensor 204 may provide a high-resolution output and withstand large variations in the gap between the MR sensor 204 and the magnet 206. The MR sensor 204 may sense angular position without the use of contacts.

The outputs from the Hall sensor 202 and the MR sensor 204 may then be processed by a microprocessor 210. In an exemplary embodiment, a PIC12 or a PIC16, from Microchip Technology may be employed; however, other microprocessors that are operable to process outputs from the Hall sensor 102 and the MR sensor 104 may also be used. The microprocessor 210 may provide an output representative of the angular position of the rotating shaft 108.

The angular position may be detected in an angle range of 360-degrees. The angle range may be expressed in any manner that would incorporate 360-degrees, such as zero to 360-degrees, or +180-degrees to −180-degrees. For example, with a positive output from the Hall sensor, the first 180-degrees of the angular position may be detected and with a negative output from the Hall sensor, the second 180-degrees of the angular position may be detected. While the microprocessor 210 may be used in an exemplary embodiment, other electronic circuitry that may be capable of signal processing may also be employed. Alternatively, the outputs of the Hall sensor 202 and the MR sensor 204 may be analyzed without the use of any signal processing.

The output signals from the Hall sensor 202 and the MR sensor 204 may be conditioned prior to entering the microprocessor 210. The signal conditioning 208 may include amplification, analog to digital conversion, and temperature compensation. While the signal conditioning 208 is shown in FIG. 2 to be external from the Hall sensor 202 and the MR sensor 204, some or all of the signal conditioning 208 may occur either within the Hall sensor 202, within the MR sensor 204, or within both of these sensors. Alternatively, no signal conditioning may be employed.

Figure 3:
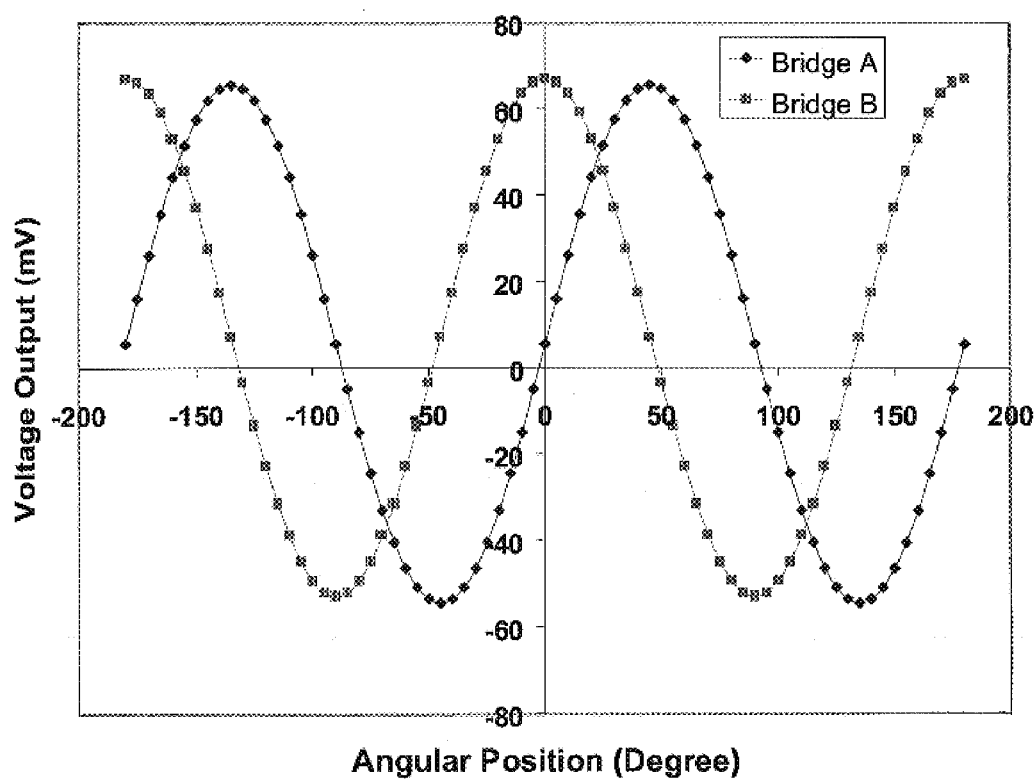
FIG. 3 is a graphical representation of an output of an MR sensor, according to an exemplary embodiment.

FIG. 3 shows a graphical representation of an output of the MR sensor 104, according to an exemplary embodiment. For example, the MR sensor 104 may have two Wheatstone bridges, Bridge A and Bridge B. The two Wheatstone bridges may be positioned such that Bridge B is rotated 45-degrees from Bridge A. The output of the MR sensor 104 may be described according to the following formulas:

Bridge A, $V_a = A \sin(2\theta) + V_{aoff}$

Bridge B, $V_b = A \cos(2\theta) + V_{boff}$

"A" may be a constant that is determined by the materials of the sensor. For example, for an HMC1512 "A" may typically be 12 mV/V. The angle $\theta$ may represent the angular position of the magnetic field. The offset may be the midpoint of the MR sensor 104 output voltage range.

Figure 4:
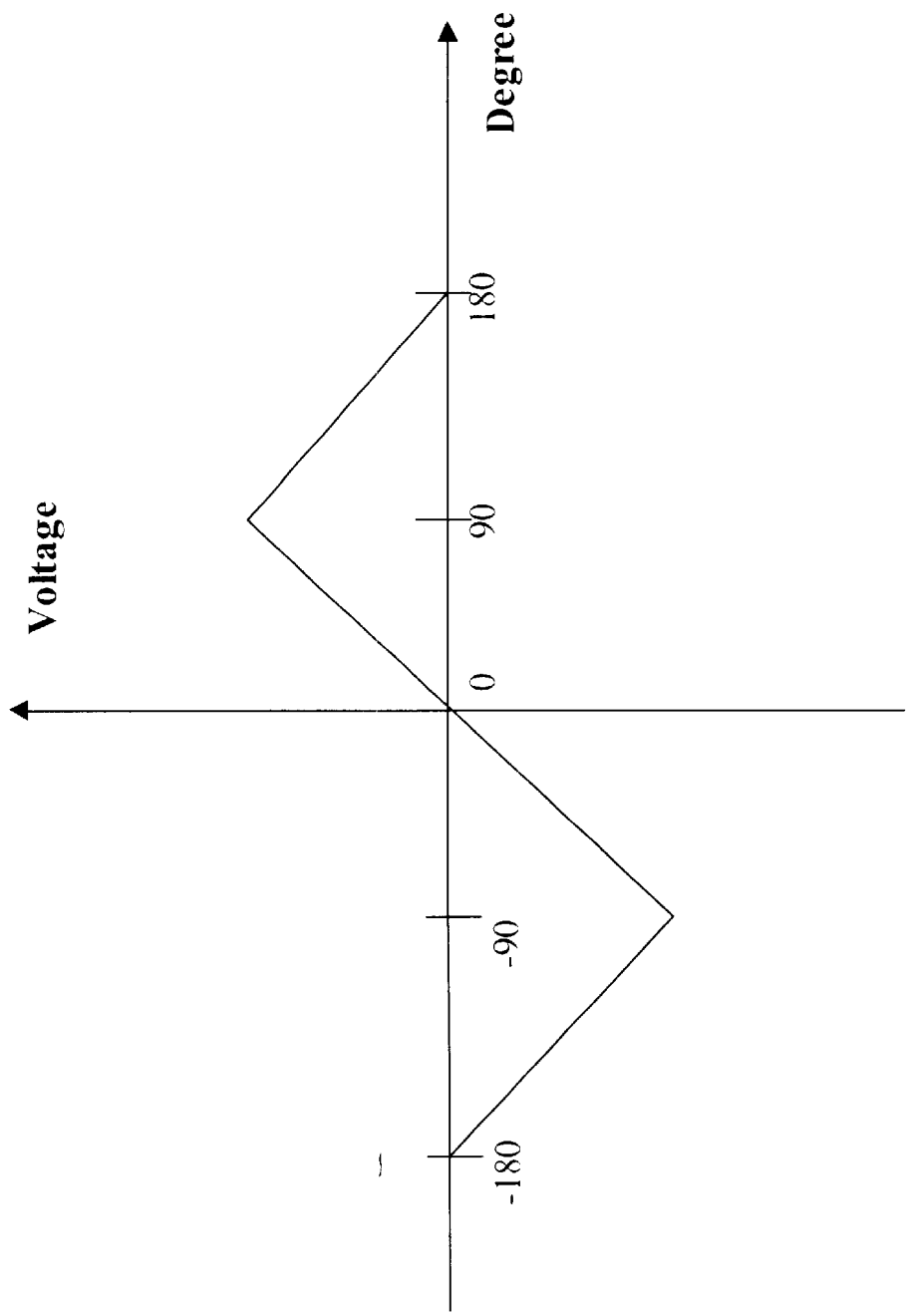
FIG. 4 is a graphical representation of an output of a Hall sensor, according to an exemplary embodiment.

FIG. 4 shows a graphical representation of an output of the Hall sensor 102, according to an exemplary embodiment. By combining the output of the Hall sensor 102 and the MR sensor 104, and incorporating the following algorithm, the angular position of the magnetic field ($\theta$) may be derived according to the following formulas:

Hall sensor output$>0(V_b - V_{boff}) > 0$, $(V_a - V_{aoff}) > 0$, $\theta = \frac{1}{2}$ arc $\tan[(V_a - V_{aoff})/(V_b - V_{boff})]$ $(V_b - V_{boff}) > 0$, $(V_a - V_{aoff})$ $< 0$, $\theta = 180 + \frac{1}{2}$ arc $\tan[(V_a - V_{aoff})/(V_b - V_{boff})]$ $(V_b - V_{boff}) < 0$, $\theta = 90 + \frac{1}{2}$ arc $\tan[(V_a - V_{aoff})/(V_b - V_{boff})]$ Hall sensor output$<0$ $(V_b - V_{boff}) > 0$, $(V_a - V_{aoff}) > 0$, $\theta = -180 + \frac{1}{2}$ arc $\tan[(V_a - V_{aoff})/(V_b$ $-V_{boff})](V_b - V_{boff}) > 0$, $(V_a - V_{aoff}) < 0$, $\theta = \frac{1}{2}$ arc $\tan[(V_a - V_{aoff})/(V_b - V_{boff})]$ $(V_b - V_{boff}) < 0$, $\theta = -90 + \frac{1}{2}$ arc $\tan[(V_a - V_{aoff})/(V_b - V_{boff})]$ Where:
  $V_a$ is the voltage output of Bridge A,
  $V_{aoff}$ is the offset voltage of Bridge A,
  $V_b$ is the voltage output of Bridge B, and
  $V_{boff}$ is the offset voltage of Bridge B.
The offset voltage of Bridge A and Bridge B may be the midpoint of the MR sensor 104 output voltage range.

By combining the outputs of the Hall sensor 102 and the MR sensor 104, the position sensor 100 may sense the rotation of the magnet 106, and therefore the angular position of the rotating shaft 108. When the output of the Hall sensor 102 is positive (Hall sensor may detect the south pole of the magnet 106), the MR sensor 104 may detect the angular position of the magnetic field from zero to +180-degrees. When the output of the Hall sensor 102 is negative (Hall sensor may detect the north pole of the magnet 106), the MR sensor may detect the angular position of the magnetic field from zero to −180-degrees.

The 360-degree rotary position sensor 100 may be produced as one integrated circuit package, as two separate integrated circuit packages (one for the Hall sensor 102 and one for the MR sensor 104), or the position sensor 100 may be integrated onto a single chip. If the position sensor 100 is provided as one integrated circuit package, a preferred embodiment may be to mount the package in the fixing plane or on the rotating shaft 108 substantially along the axis of rotation. If the position sensor 100 is produced as two separate packages, a preferred embodiment may be to mount the MR sensor 104 in the fixing plane or on the rotating shaft 108 substantially along the axis of rotation, while mounting the Hall sensor 102 on the non-magnet side of the MR sensor 104 in a manner such that the Hall sensor 102 may detect the polarity of the magnetic field. The Hall sensor 102 may also be mounted substantially along the axis of rotation. Other packaging and mounting methods that are compatible with detecting the magnetic field may also be employed.

It should be understood that the illustrated embodiments are exemplary only and should not be taken as limiting the scope of the present invention. The claims should not be read as limited to the described order or elements unless stated to that effect. Therefore, all embodiments that come within the scope and spirit of the following claims and equivalents thereto are claimed as the invention.

The embodiments of the invention in which an exclusive property or right is claimed are defined as follows:

1. A 360-degree rotary position sensor system, comprising in combination:
  a magnetoresistive sensor operable to generate a sinusoidal output representative of an angular position of a magnetic field with an angle range of 180-degrees; and
  a Hall sensor operable to generate an output representative of a polarity of the magnetic field, wherein a combination of the sinusoidal output and the polarity provides an angle range of 360-degrees.

2. The system of claim 1, wherein the 360-degree rotary position sensor is operable to detect an angular position of a magnetic field in an angle range of 360-degrees.

3. The system of claim 1, wherein the 360-degree rotary position sensor system is located substantially close to a magnet, thereby the 360-degree rotary position sensor system is operable to detect a magnetic field produced by the magnet.

4. The system of claim 3, wherein the magnet is mounted on a rotating shaft.

5. The system of claim 3, wherein the magnet is a bar magnet.

6. The system of claim 3, wherein the magnet is a disc magnet.

7. The system of claim 3, wherein the magnet is composed of a material selected from the group consisting of neodymium iron boron (NdFeB), samarium cobalt (SmCo), Alnico, and ceramic ferrite.

8. The system of claim 1, wherein the 360-degree rotary position sensor is substantially located in a fixing plane.

9. The system of claim 8, wherein the fixing plane is a stationary plane perpendicular to an axis of rotation.

10. The system of claim 1, wherein the magnetoresistive sensor is operable to detect an angular position of a magnetic field.

11. The system of claim 1, wherein the Hall sensor is operable to detect a polarity of a magnetic field.

12. The system of claim 1, wherein the magnetoresistive sensor and the Hall sensor are located substantially at a center of an axis of rotation of a rotating shaft.

13. The system of claim 1, wherein the magnetoresistive sensor is located substantially parallel to a magnet mounted on a rotating shaft.

14. The system of claim 13, wherein a gap is located substantially between the magnetoresistive sensor and the magnet.

15. The system of claim 14, wherein the gap is determined by factors selected from the group consisting of magnetic field strength, position sensor application, mechanical clearance, and tolerance.

16. The system of claim 14, wherein the gap is substantially within the range of 3–10 mm.

17. The system of claim 1, wherein the Hall sensor is located on a non-magnet side of the magnetoresistive sensor.

18. The system of claim 1, further comprising a microprocessor.

19. The system of claim 18, wherein the microprocessor is operable to provide an output representative of an angular position of a magnetic field.

20. The system of claim 19, wherein the angular position is detectable in an angle range of 360-degrees.

21. The system of claim 1, further comprising signal conditioning.

22. The system of claim 21, wherein the signal conditioning is operable to provide amplification.

23. The system of claim 21, wherein the signal conditioning is operable to provide analog to digital conversion.

24. The system of claim 21, wherein the signal conditioning is operable to provide temperature compensation.

25. The system of claim 1, wherein the 360-degree rotary position sensor is produced as one integrated circuit package.

26. The system of claim 1, wherein the 360-degree rotary position sensor is mounted on a rotating shaft.

27. A 360-degree rotary position sensor system, comprising in combination:

a magnetoresistive sensor operable to generate a sinusoidal output representative of an angular position of a magnetic field with an angle range of 180-degrees, wherein the magnetoresistive sensor is located substantially parallel to a magnet mounted on a rotating shaft, wherein a gap is located substantially between the magnetoresistive sensor and the magnet, and wherein the magnetoresistive sensor is located substantially at a center of an axis of rotation of the rotating shaft;

a Hall sensor operable to generate an output representative of a polarity of the magnetic field, wherein the Hall sensor is located on a non-magnet side of the magnetoresistive sensor, and wherein the Hall sensor is located substantially at the center of the axis of rotation of the rotating shaft;

signal conditioning operable to provide amplification, analog to digital conversion, and temperature compensation; and a microprocessor operable to provide an output representative of the angular position of the magnetic field, wherein the angular position is detectable in an angle range of 360-degrees.

28. A method of making a 360-degree rotary position sensor, comprising in combination:

positioning a magnetoresistive sensor substantially parallel to a magnet mounted on a rotating shaft, wherein a gap is located substantially between the magnetoresistive sensor and the magnet, wherein the magnetoresistive sensor is located substantially at a center of an axis of rotation of the rotating shaft, and wherein the magnetoresistive-sensor is operable to generate a sinusoidal output representative of an angular position of a magnetic field with an angle range of 180-degrees;

positioning a Hall sensor on a non-magnet side of the magnetoresistive sensor, wherein the Hall sensor is located substantially at the center of the axis of rotation of the rotating shaft, and wherein the Hall sensor is operable to generate an output representative of a polarity of the magnetic field; and combining an output of the magnetoresistive sensor with an output of the Hall sensor, thereby providing a signal representative of the angular position, wherein the angular position is detectable in an angle range of 360-degrees.

29. The method of claim 28, wherein the magnet is a bar magnet.

30. The method of claim 28, wherein the magnet is a disc magnet.

31. The method of claim 28, wherein the magnet is composed of a material selected from the group consisting of neodymium iron boron (NdFeB), samarium cobalt (SmCo), Alnico, and ceramic ferrite.

32. The method of claim 28, wherein a microprocessor is operable to combine the output of the Hall sensor with the output of the magnetoresistive sensor.

* * * * *

UNITED STATES PATENT AND TRADEMARK OFFICE
CERTIFICATE OF CORRECTION

PATENT NO. : 6,707,293 B2
DATED : March 16, 2004
INVENTOR(S) : Hong Wan and Tamara Bratland It is certified that error appears in the above-identified patent and that said Letters Patent is hereby corrected as shown below:

Column 5,
Lines 20-50, please change the locations of the carriage returns so that the equations read as follows:

-- Hall sensor output > 0

$(V_b - V_{boff}) > 0, (V_a - V_{aoff}) > 0,$ $\Theta = \frac{1}{2} \arctan[(V_a - V_{aoff})/(V_b - V_{boff})]$ $(V_b - V_{boff}) > 0, (V_a - V_{aoff}) < 0,$ $\Theta = 180 + \frac{1}{2} \arctan[(V_a - V_{aoff})/(V_b - V_{boff})]$ $(V_b - V_{boff}) < 0,$ $\Theta = 90 + \frac{1}{2} \arctan[(V_a - V_{aoff})/(V_b - V_{boff})]$ Hall sensor output < 0

$(V_b - V_{boff}) > 0, (V_a - V_{aoff}) > 0,$ $\Theta = -180 + \frac{1}{2} \arctan[(V_a - V_{aoff})/(V_b - V_{boff})]$ $(V_b - V_{boff}) > 0, (V_a - V_{aoff}) < 0,$ $\Theta = \frac{1}{2} \arctan[(V_a - V_{aoff})/(V_b - V_{boff})]$ $(V_b - V_{boff}) < 0,$ $\Theta = -90 + \frac{1}{2} \arctan[(V_a - V_{aoff})/(V_b - V_{boff})]$ --

Signed and Sealed this

Twenty-second Day of June, 2004

JON W. DUDAS
*Acting Director of the United States Patent and Trademark Office*